March 5, 1968
K. V. THOMAS
3,371,873
REFINING APPARATUS
Original Filed July 23, 1963
9 Sheets-Sheet 1
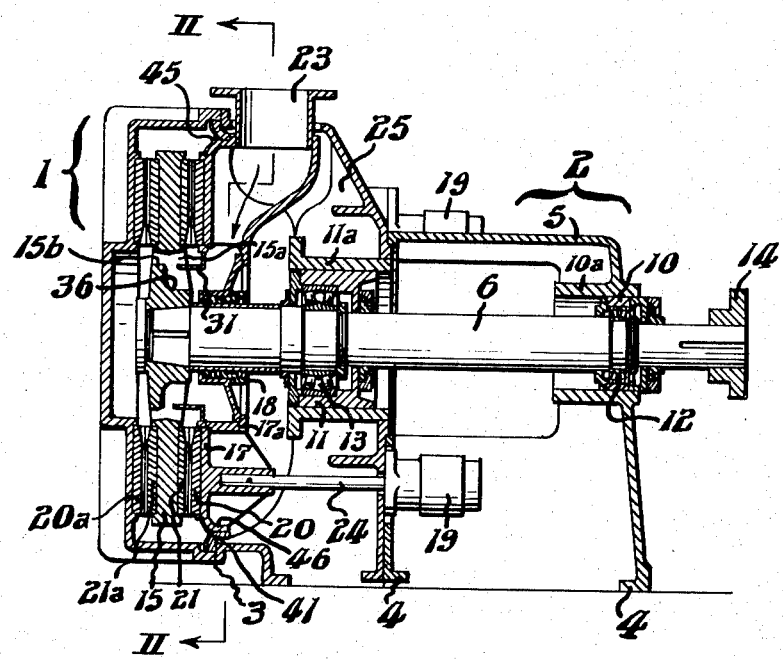
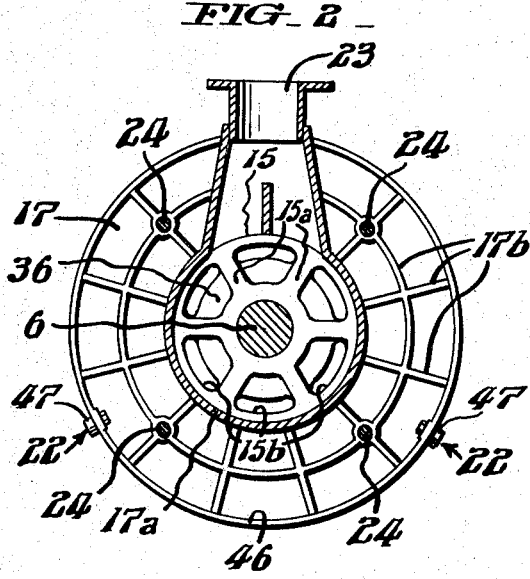
INVENTOR.
Keith V. Thomas,
BY
Paul & Paul
ATTORNEYS.

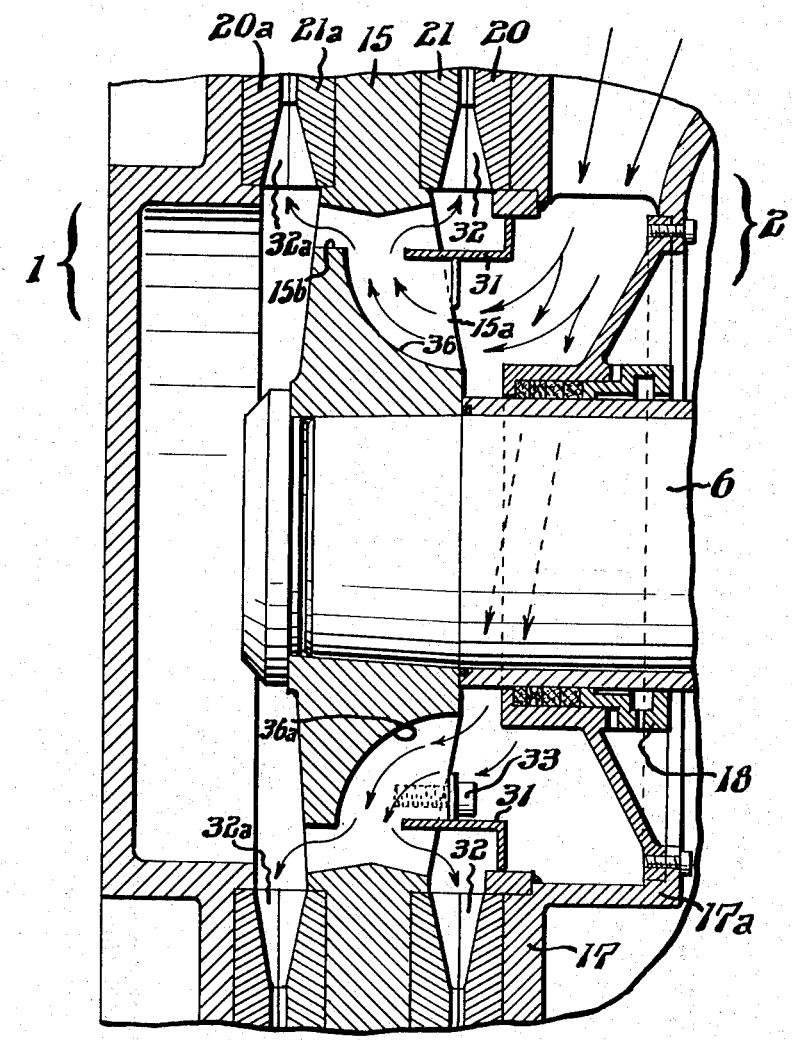

March 5, 1968 K. V. THOMAS 3,371,873
REFINING APPARATUS
Original Filed July 23, 1963 9 Sheets-Sheet 3
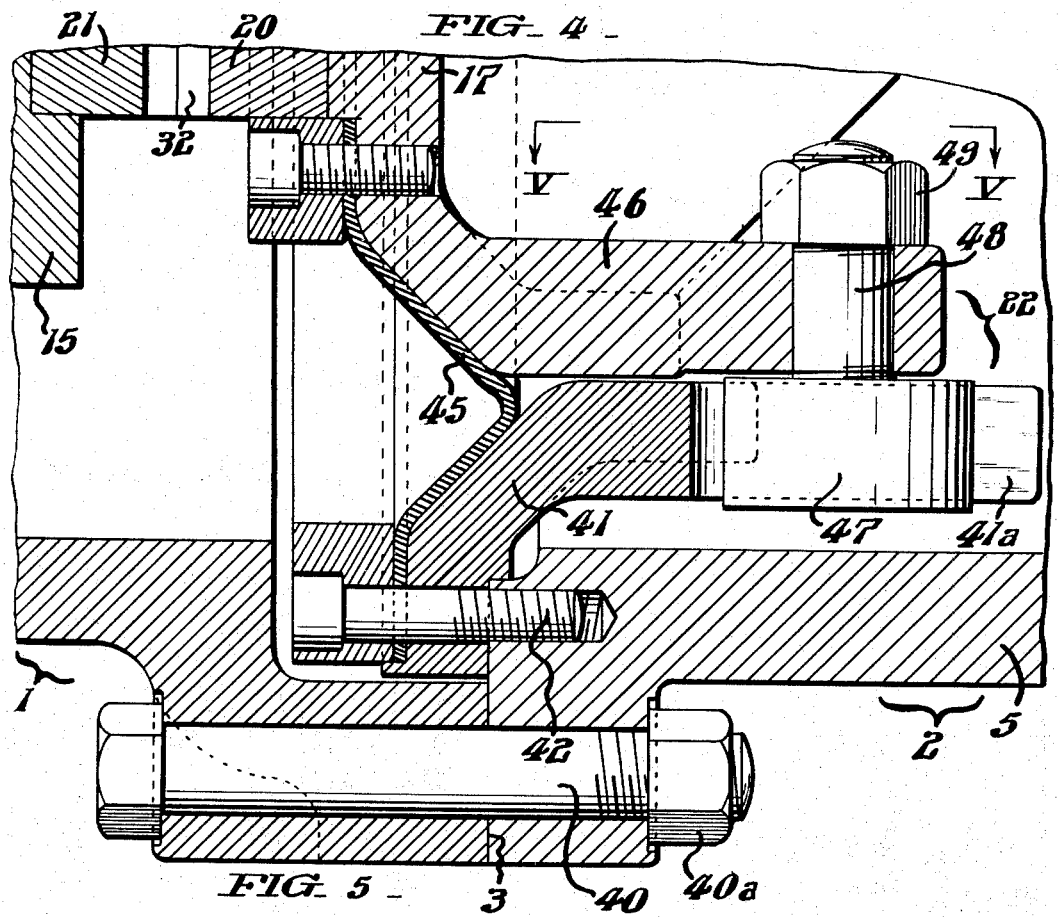
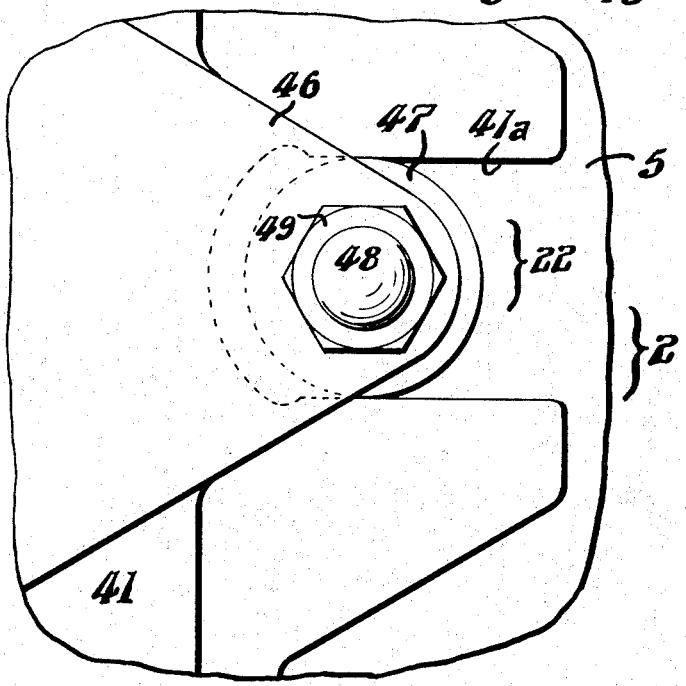
INVENTOR.
Keith V. Thomas,
BY
Paul & Paul
ATTORNEYS.

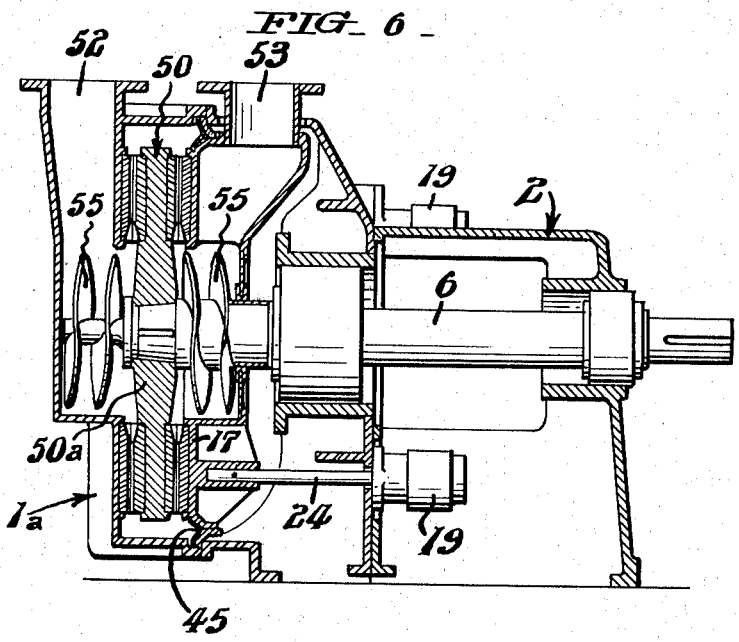
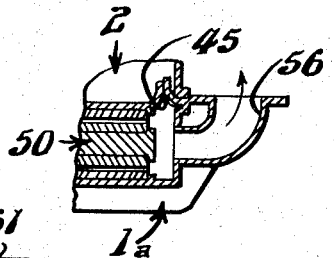
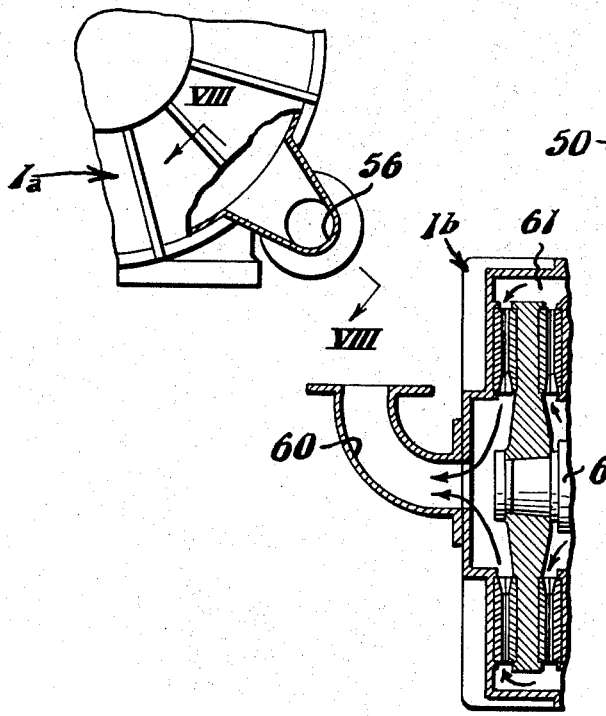

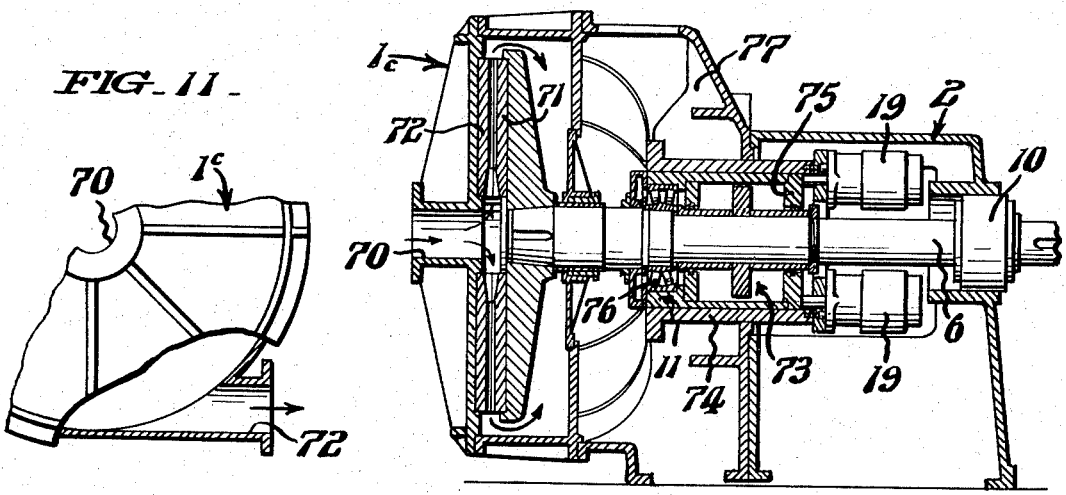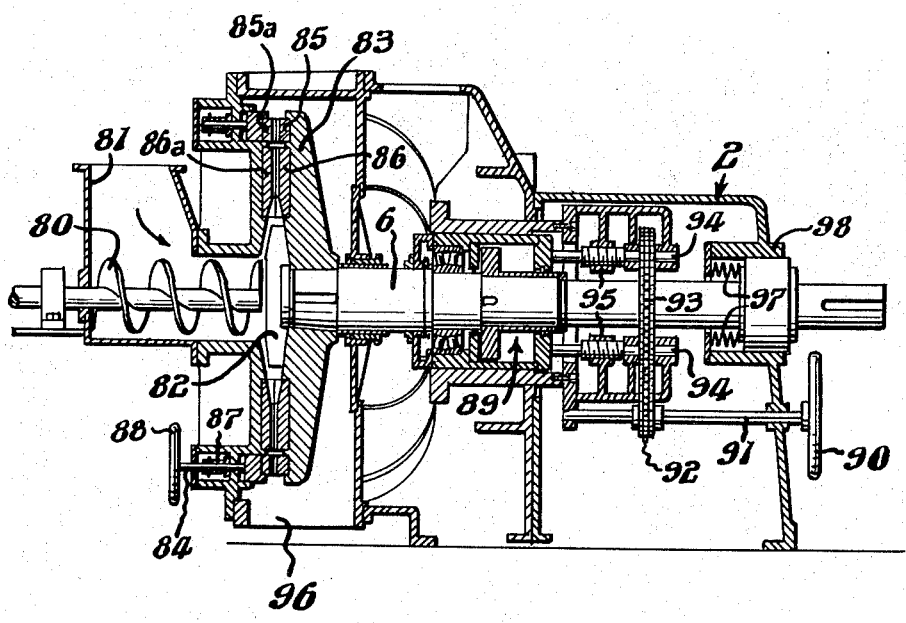

March 5, 1968 K. V. THOMAS 3,371,873
REFINING APPARATUS
Original Filed July 23, 1963 9 Sheets-Sheet 6
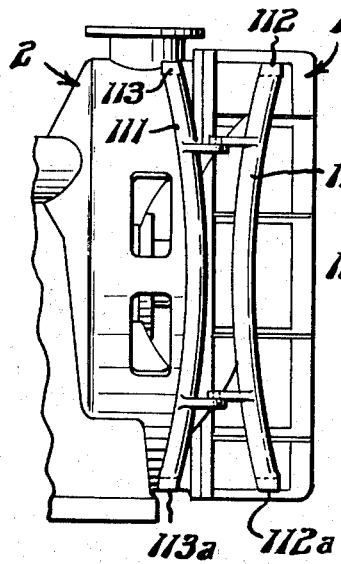
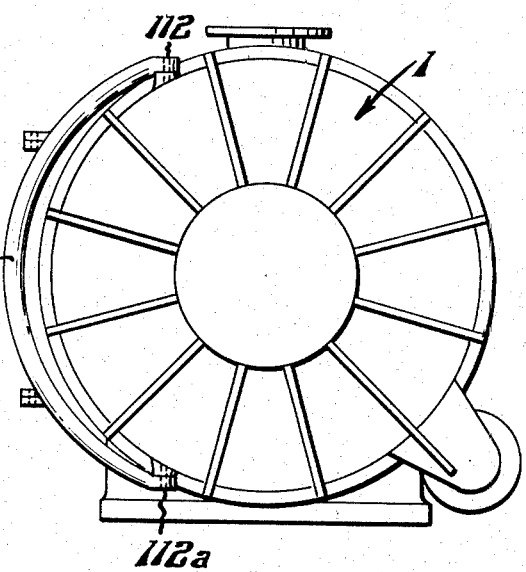
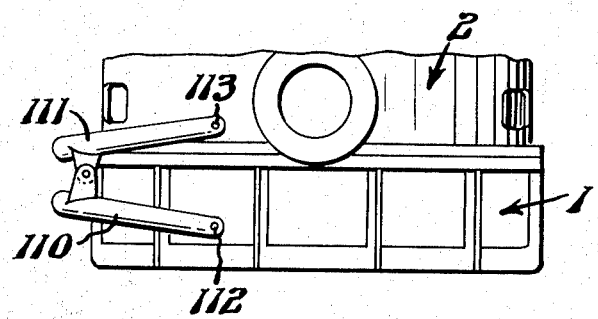
INVENTOR.
Keith V. Thomas,
BY
Paul & Paul
ATTORNEYS.

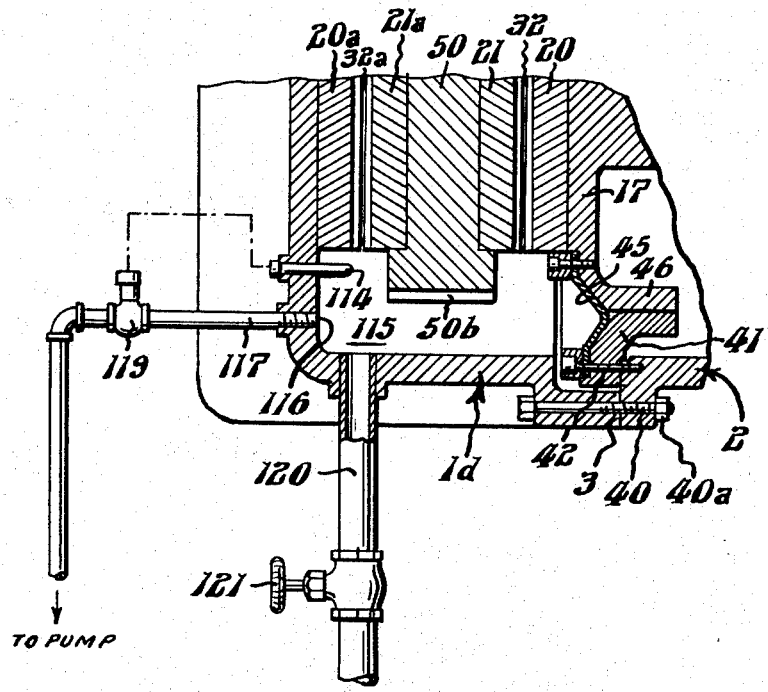

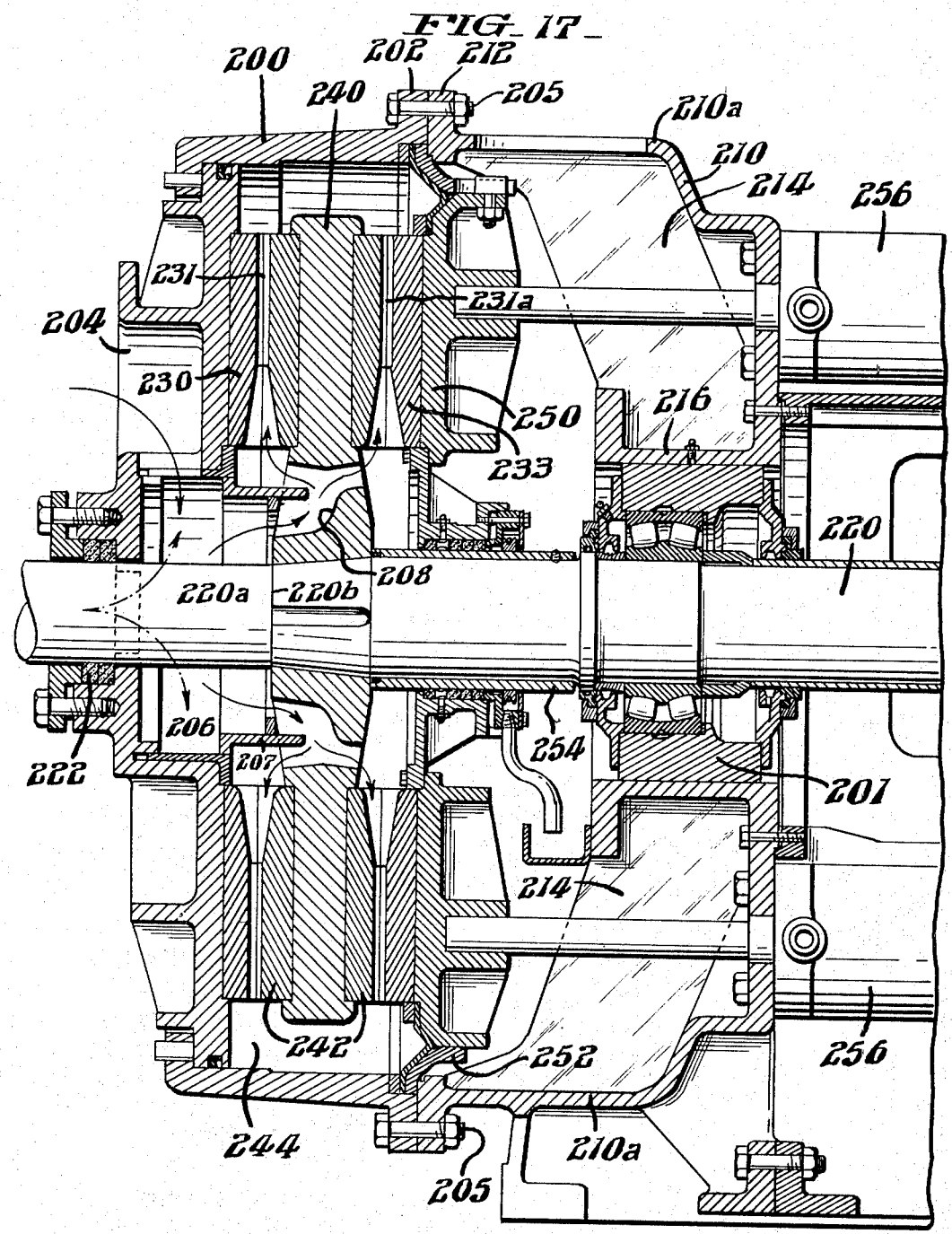

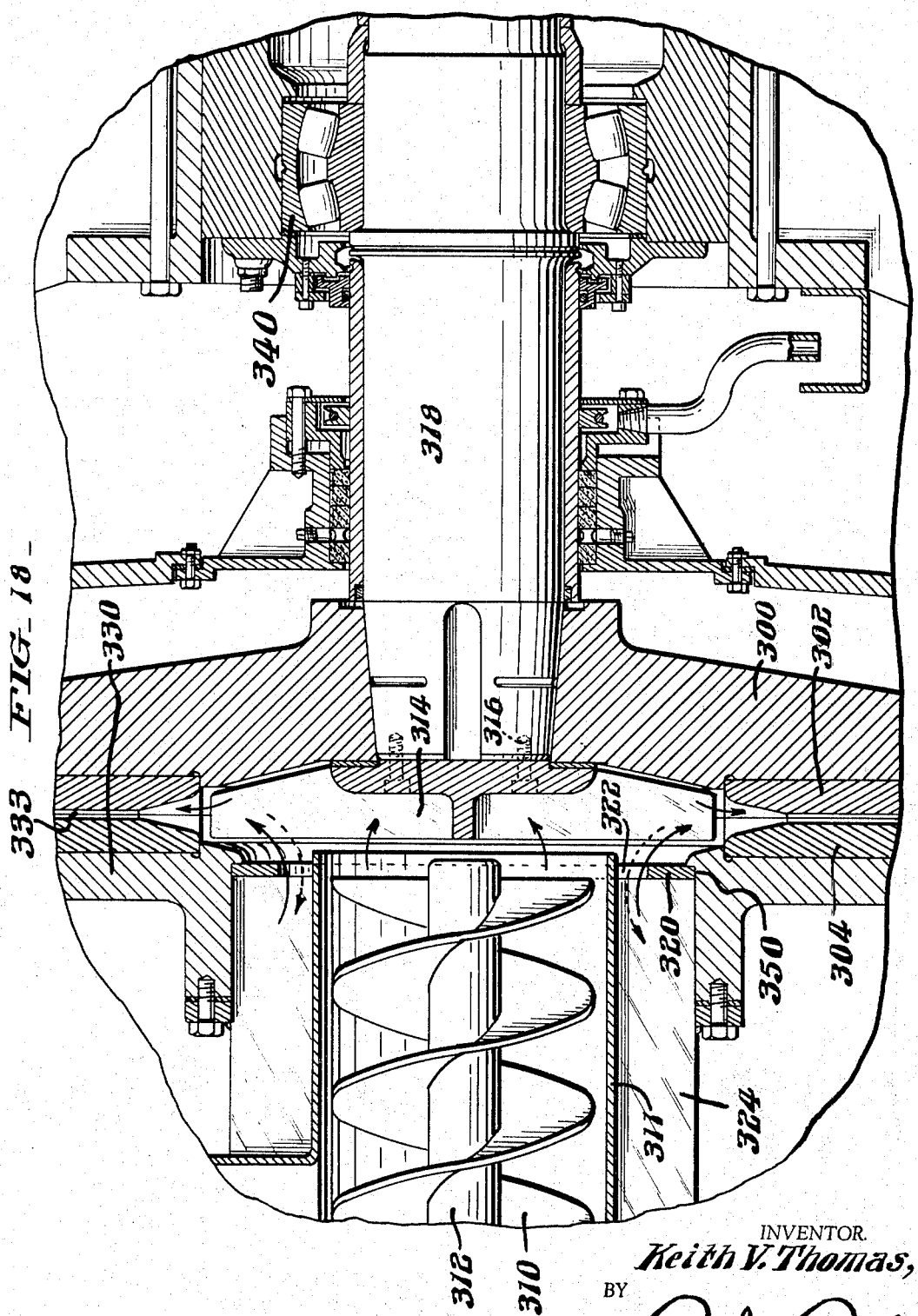

3,371,873
REFINING APPARATUS
Keith V. Thomas, 613 W. State St.,
Trenton, N.J. 08618
Continuation of application Ser. No. 297,737, July 23, 1963. This application Mar. 24, 1966, Ser. No. 537,244
14 Claims. (Cl. 241—163)

This application is a continuation of application Ser. No. 297,737 filed July 23, 1963, now abandoned, which, in turn, is a continuation-in-part of application, Ser. No. 215,640, filed Aug. 8, 1962, now abandoned.

The present invention relates to the art of comminuting and, in particular, to a refining apparatus adapted for cutting and fibrillating the individual fibers composing various fibrous materials. In the paper industry, these machines are generally recognized as refiners.

Fibrous materials as used in the manufacture of pulp, paper, fiberboard and similar products vary greatly in their physical characteristics. To condition these fibers for use, there are a variety of processes both chemical and mechanical through which the fibers are treated prior to the actual mechanical refining or grinding step. Subsequent to the preliminary treatment, there are a variety of types of grinding treatment which may be given the material so as to change and otherwise condition the physical properties of the final fibrous product.

The table set out below shows generally the range of yield of useable, finished product in relation to the raw material and the basic treatment employed.

PULP PROCESS CHARACTERISTICS

| YIELD % | 0 | 10 | 20 | 30 | 40 | 50 | 60 | 70 | 80 | 90 | 100 |
|---|---|---|---|---|---|---|---|---|---|---|---|
| RAW MATERIAL | | Cereal Straws and Grasses | | | | | | Woods | | | |
| PULP TYPE | | Chemical | | | | | Semi-Chemical | | | | |
| | | | | | | | | | | Mechanical | |
| PROCESS | | | | | Kraft | | | | | | |
| | | | | | Sulphite | | | | | | |
| | | | | | | | N.S.C. | | | | |
| | | | | | Bleachable Grade | | Corrogating Grade | | | | |
| | | | | | | | | Cold Caustic | | | |
| | | | | | | | | | Ground wood or Equivalent | | |
| PROCESS MATERIAL CHARACTERISTICS | | Fibers already separated | | | | | | | | | |
| | | | Fibers in bundles or in chip form but with the bonds weakened or softened | | | | | | | | |
| | | | | | | | | Fibers in chip form with bond unaffected or slightly softened | | | |
| TREATMENT REQUIRED | | Fiber Physical Property Development | | | | | | | | | |
| | | | | Fiber separation and Physical property development | | | | | | | |
| | | | | | | | Fiber separation and physical property development | | | | |

The cereal straws and grasses, shown in broken lines, are more successfully treated by a chemical process rather than mechanical processes, and tend to much lower yields than is available from woods. Both woods and cereals may be treated prior to refining by the well known kraft, sulphite, cold caustic and other processes.

The cereals and woods which have been processed to a low yield either have the fibers already separated or they are relatively easily separated. The individual fibers need to be treated to modify their physical shape or surface so that they make a product of better quality.

Woods processed to higher yields (up to where they are not given any pretreatment other than to be reduced to chip form) require increasing degrees of fiber separation as with increasing yields the natural bonds between the fibers tend to be stronger. Thus, refiners are required to carry out two functions, one, fiber separation, and the other, treatment of the separated fibers to give the required properties to the final product.

In the second table shown below, the refiner requirements are set out in relation to the pulp characteristics, with the grasses and straws again shown by the broken lines and the woods by the solid lines.

REFINER REQUIREMENTS TO MEET PULP AND PROCESS REQUIREMENTS

| YIELD | 0 | 10 | 20 | 30 | 40 | 50 | 60 | 70 | 80 | 90 | 100 |
|---|---|---|---|---|---|---|---|---|---|---|---|
| CIRCUMFERENTIAL DISC SPEED FEET PER MINUTE | | ------- | ------- | ------- | ------- | 3000-6000 | | | | | |
| | | | | | | | 9000-15000 | | | | |
| | | | | | | | | | 12000 - 36000 | | |
| FEED ARRANGEMENT | | | | Fluid | | | | | | | |
| | | | | | | | | Screw or Dry | | | |
| CASING TYPE | | ------- | ------- | Pressure | | | | | | | |
| | | | | | | | Free or gravity discharge | | | | |
| PRESSURE BETWEEN THE GRINDING DISC SURFACES | | ------- | ------- | Extremely Heavy | | | | | | | |
| | | | | | | | | Moderate | | | |
| | | | | | | | | | | Light | |
| CONSISTENCY OF PULP (O.D. BASIS) % | | ------- | 2 - 7% | | | | | | | | |
| | | | | | | 4 - 16% | | | | | |
| | | | | | | | | | 8 - 40% | | |
| DISC SURFACE ADJUSTMENT | | ------- | ------- | Hydraulically loaded together | | | | | | | |
| | | | | | | | Mechanically adjusted gap or Hydraulically adjusted gap | | | | |
| TYPE DISC SURFACE | | ------- | Wide bars and Grooves | | | | | | | | |
| | | | | | | | Narrow Bars and Grooves | | | | |
| | | | | | | | | | Small bars and grooves or stone surfaces | | |

The above table indicates that the disc speed required for processing the low yield or separated fibers is lower than the speeds required for fiber separation at the higher yields.

Again the lower yield pulps are usually conveyed to the refiner in a water or liquid suspension which can be readily pumped. As yields increase, the consistency of the suspension increases up to the point where the fiber suspension cannot be pumped and screw feeding arrangements are necessary.

Again low yield pulps require heavy pressures between the grinding disc surfaces to affect the fibers in the manner required. With increasing yield the load required between the grinding surfaces decreases as the fibers and the bonds between them are in a more brittle condition.

The existing state of the art requires several types of refiners to carry out the types of treatment indicated above and to otherwise produce the desired properties in the pulp as required by the final product. Each of the refiners available to perform these different treatments is specifically designed as a particular type of refiner, e.g., gravity discharge or pressurized casing with mechanical or hydraulic loading. Some existing refiners are able to accept either a liquid suspension or, with a feed screw, the fibers in a relatively dry condition.

Therefore, it is the primary object of this invention to teach and describe a refining system which will accommodate and refine all types of fibrous materials into finished products having the physical properties required. In the preferred form of my invention which is disclosed herein, the refiner consists of a basic refiner frame to which a variety of components may be assembled and adapted.

In addition, the refining machines of the prior art have several inherent disadvantages which are overcome by the structure of this invention. To achieve the desired state of refining, it is important that the gap or spacing between the rotating and non-rotating grinding surfaces or the force applied to these surfaces be adjustable with extreme accuracy. In addition, it is important that this spacing or force be maintained at all points between the two surfaces and not only when the machine is at rest but also when it is under operating conditions with very heavy pressure or forces being generated within the casing as is common in the refining of low yield pulps. This spacing or force must be maintained in spite of temperature variations and the refining structure must be so designed so that the material, often in the state of mash or semi-liquid, does not contaminate the bearing surfaces so as to interfere with free axial movement of the refining disc and shaft. Further, the refiner should be designed so as to accommodate large torque forces generated by the rotating disc and these forces must be distributed evenly to the frame so as to prevent misalignment of the grinding surfaces. In some refiners of the prior art, distortions in the rotating disc and the non-rotating disc or grinding surfaces are large enough to seriously affect the refining process, particularly with high pressures or loading. In other refiners, adjustment of the space between the grinding discs or free movement of the loading head is difficult because of clogging in the axially sliding seal surfaces and a lack of satisfactory seals. In refiners employing a single rotating disc, with two grinding surfaces on opposite sides of the disc, satisfactory operation depends upon the pulp flow through either side of the disc, the spacing between the grinding surfaces and the loading between the two grinding surfaces all being equal. In this invention this is accomplished by providing internal flow guides and a free-floating shaft. Other refiners of the prior art do not provide adequate means for controlling the axial movement of the rotating disc in conjunction with structure which resists the torque developed by the rotating disc. The present invention teaches a refining apparatus, which substantially overcomes the above mentioned limitations and disadvantages, and thereby provides a superior refiner producing a quality controlled product.

Therefore, it is an object of this invention to provide in a refining apparatus, one basic structure to which various components may be added or substituted, or other modifications may be made to accommodate various types of fibrous materials to best advantage.

It is among the further objects of this invention to provide in a refining apparatus means for controlling and maintaining the precise spacing or loading between the refining surfaces, means for dissipating the torque created, means for allowing smooth axial movement of the shaft and other features which produce the desired refined product. Other objects and attendant advantages of the refiners of this invention will become more apparent from the description herein and from the attached drawings wherein:

FIG. 1 is a vertical sectional view taken longitudinally through the basic structure of the disc refiner of my invention with the components arranged for pressurized treatment, with parallel flow, hydraulic loading and fluid feed;

FIG. 2 is a sectional view taken along the lines and arrows II—II of FIG. 1;

FIG. 3 is an enlarged sectional view of the flow passages of the refiner of FIG. 1;

FIG. 4 is an enlarged sectional view of the flexible diaphragm and other components as shown in FIG. 1 near the bottom;

FIG. 5 is a top view of a cam follower taken along the lines and arrows V—V of FIG. 4;

FIG. 6 is a vertical sectional view taken longitudinally of a refiner having a modified feeding apparatus;

FIG. 7 is a partial front view from the left hand side of the apparatus shown in FIG. 6 showing the discharge vent;

FIG. 8 is an enlarged view in section taken along the lines and arrows VIII—VIII of FIG. 7;

FIG. 9 is a partial, longitudinal sectional view of a refiner showing the grinding discs and a modification of the flow;

FIG. 10 is a longitudinal, sectional view of a single passage rotating disc refiner;

FIG. 11 is a front view, partly in section, of the refiner shown in FIG. 10;

FIG. 12 is a longitudinal, sectional view of another modification of the basic refiner shown in FIG. 1;

FIG. 13 is a partial, side elevational view of the front casing of a refiner;

FIG. 14 is a front view of the casing shown in FIG. 13;

FIG. 15 is a top view of the refiner shown in FIGS. 13 and 14;

FIG. 16 is a partial, sectional view of the casing and grinding surfaces with a water injection system shown diagrammatically;

FIG. 17 is a partial view in vertical section of the front area of a refiner of this invention having a modified front axial feed; and FIG. 18 is a partial view in vertical section of an axial feed refiner having a further modification.

Referring first to FIG. 1 of the drawings, one form of the basic structure of the refiner of my invention can be identified as the basic frame structure 2 and the front casing 1 which join around the circumference of the substantially round refiner at line 3. In this view of the basic structure of my invention the components are arranged for pressurized treatment with parallel flow, hydraulic loading and fluid feed. The frame 5 is firmly anchored through holes in its base 4 to the working surface so as to support and contain any vibrations caused by the operating machine. A horizontal driving shaft 6, which could be arranged vertically, is supported for rotation in rear frame 5 by means of two bearing plugs 10, 11 which are free to slide axially in two bearing sleeves 10a, 11a, respectively. The front bearing 13 is mounted as close as possible to the loading head bearing surface 18 so that the bearings 13 can best resist forces set up by the rotating disc to move the shaft one way or another. In some refiners of the prior art, the front bearing is positioned relatively far back from the roating disc and, consequently, does not provide as much support for the shaft. As shown in FIG. 1, shaft 6 has bearings 12, 13, mounted thereon and these bearings allow the shaft to rotate freely and move with the shaft when axial movement is desired. A coupling 14 is mounted on the distal end of shaft 6 to connect to a driving engine (not shown), thereby causing the main refining or grinding disc 15, carried and attached to the opposite end of the shaft, to rotate at the desired speed. This coupling, besides imparting rotating motion, is designed to allow free axial movement of the shaft assembly. Any conventional drive means may be used to rotate shaft 6.

Rotating disc 15 can be provided with one or two grinding surfaces on opposite sides of the disc and the surfaces can be in segments or made up in one annular disc or ring as is well known in the prior art; also a variety of materials may be used, such as, cast iron, ni-hard, stainless steel, Carborundum, natural stones, etc. In FIG. 1, rotating disc 15 is shown with two annular grinding surfaces 21, 21a by which the material to be refined passes. The non-rotating grinding surfaces 20, 20a are rigidly mounted so as to resist the torque created by the rapidly rotating disc and the pressure on the material passing between the grinding surfaces. Non-rotating surface 20a is attached to the front casing 1 and is stationary when casing 1 is bolted closed to the main refiner structure 2. Annularly shaped, non-rotating grinding surface 20 is mounted on an annular loading head 17 which is shown also in section in FIG. 2. The loading head 17 is moved axially by a plurality of cylinders 19 arranged radially around shaft 6. The loading head 17 is supported at its outer periphery by the guide piece 41. The loading head shaft bearing surface 18 is equipped with a water lubricated packing seal so as to separate the refining area from the bearing 13 and other structure.

A series of radially arranged webs 25 extend out from the front bearing sleeve 11a forward to support the main frame 5 where it joins the front casing 1 around line 3 so as to prevent a heavy refining load from causing the disc 15 and shaft 6 to move at one end and become misaligned with the stationary grinding surfaces 20, 20a. Loading duct 23 provides an entrance for the material to be refined and the arrow of FIG. 1 shows the direction the material takes while proceeding to the refining surfaces.

When material of a low yield nature is refined, the non-rotating grinding surface 20 by means of hydraulic arms 24 is pushed closer to the rotating grinding surface 21 and as the disc 15 and shaft 6 can move axially, shaft 6 moves automatically so as to equalize the pressure between both sides of the disc and the non-rotating surfaces 20, 20a. The disc is thereby held equidistant from both surfaces. When a material in the nature of wood chips of high yield is to be refined, the hydraulic cylinders 19 and arms 24 withdraw the loading head 17 so as to create a greater distance between the grinding surfaces, the distance being equalized on both sides of disc 15 by the moving shaft and disc.

Referring now to FIG. 2, loading head 17 includes the annual support flange 17a, and the supporting ribs 17b which are connected to the hydraulic arms 24 move the loading head 17 axially. Around shaft 6 is shown the disc deflecting surface 36 and spokes 15a which support the disc body and provide spaces 15b through which material flows to the grinding surfaces.

In the enlarged sectional view of the refiner head of FIG. 3, the structure for controlling the flow of material to be refined is shown in detail. The material is first pumped into the loading duct 23 (shown in FIG. 1) through a flexible conduit which allows free axial movement of the loading head 17. The material flows into the annular space around the shaft 6 and then between annular deflecting flange 31 and disc deflecting surface 36; said deflecting flange 31 and surface 36 being arranged so as to be equally spaced on each side of the transverse axis of the revolving disc 15 thereby causing the material to be evenly divided between the annular channels 32 and 32a. By means of this flange structure and curved surface openings in the revolving disc, the material is evenly directed to and between the disc refining surfaces and the non-rotating grinding surfaces. If it were not for this construction, more material would flow down one channel than the other causing unequal spacing between the grinding surfaces and/or an uneven refining action. The apparatus shown removes the necessity for separate external conduits to each set of grinding surfaces in the refiner when a double flow disc is used. Deflecting flange 31 is ring shaped and rotates with disc 15 being attached by screws 33. A small clearance exists between the outside diameter of flange 31 and the loading head 17 supporting the stationary grinding disc 20.

Referring to FIG. 4, the point or line of union 3 between the front casing 1 and the rear structure 2 of the refiner is shown in detail. In place of hinges and quick release bolts as shown in FIGS. 13–15, the casing and structure 2 are joined by means of threaded bolts 40 and nuts 40a. An annular loading head guide member 41 is attached by means of bolts 42 to the base frame 5 holding these between an annular flexible diaphragm 45 which, in turn, is attached to loading head 17. As is also indicated in FIG. 1, casing 46 is the supporting member for loading head 17 so that when the loading head 17 is pushed or pulled, casing 46 slides along the top of guide piece 41. The two bearing surfaces are highly machined so that motion is possible with only a small degree of effort. The seal 45 is an annular shaped flexible diaphragm supported by the forward surfaces of head 17 and member 41 and extends completely around the refiner so as to completely separate the front or pulp chamber from the rear section. This diaphragm prevents the passage of fibrous materials to and between the sliding surfaces and thus retarding or preventing proper movement. Cam follower 22 consists of a roller bearing 47 held by a bolt 48 and nut 49 to casing 46. The bearing 47 slides within a groove 41a in guide piece 41, as shown in FIG. 5, so as to allow axial movement of the casing 46 and loading head 17 but to prevent rotational movement of the loading head.

Modification of FIG. 6

FIG. 6 illustrates a modification of the basic refiner design shown in FIG. 1 and described above. This modification is designed for the treatment of fiber bundles or chips where the material tends to fall out of suspension in the liquid, or alternatively, this structure is used where there is advantage in treating the fiber bundles in the dry condition. The rotating disc 50 has a solid center portion 50a, and two feed inlets 52, 53 provide a flow of material to the twin screws 55 which feed the material at a predetermined rate to the grinding surfaces. The distance between the grinding surfaces is controlled by hydraulic cylinders 19 moving the loading head 17 so that the desired quality of product is achieved. In refiner application where mechanical pulp with characteristics similar to conventional groundwood is produced it is necessary to refine at high speed and in a relatively dry condition to insure the required physical properties. The present state of the art requires that the refined product be discharged by gravity from the pulp chamber similar to that shown in FIG. 12.

In applications where there is advantage in giving the material a "series flow" treatment or two passes through or between grinding surfaces an arrangement as shown in FIG. 9 is used. The material flows in the direction of the arrows from an inlet (not shown) between the right hand grinding surfaces into annular space 61 and then between the left hand grinding surfaces until it is discharged out outlet 60.

As a modification of the refiner design shown in FIG. 6, where there is advantage to treating the material in dry condition as in the design of FIG. 6 and yet controlling the rate of discharge of the refined material, the refiner construction of FIG. 16 is superior. This modification describes a refiner in which refining between the grinding surfaces is carried out in a relatively dry state to produce the desired mechanical pulp properties and then, a liquid, usually water, is added to the casing so that the produced pulp can be discharged directly from the casing into a pipe system. By means of a throttle valve at the discharge, the length of time the material is retained between the grinding surfaces may be varied.

FIG. 16 shows, in partial enlarged sectional view, the structure of the refiner taken adjacent to the outer periphery of the casing 1d. An inlet 116 is provided for introducing water into the annular space 115 existing between the revolving disc 50 and the casing 1d. A probe 114, which may be pressure or temperature sensitive, is positioned in casing 1d adjacent to the stationary grinding disc 20a. The material discharged from between the grinding surfaces 20a and 21a acquires a high temperature due to the mechanical work performed on it. If a temperature probe is used, then the quantity of water admitted to space 115 through opening 116 and conduit 117 is controlled by a valve 119 so as to maintain the desired temperature within casing area 115. The probe 114 is operatively connected by means well known in the art to the valve 119 so that when the pre-set temperature is reached, the valve 119 opens to allow a flow of water into the casing. The water so introduced is held around the periphery of the casing 1d by the centrifugal force of rotating disc 50, and said water does not penetrate any appreciable distance up and between the grinding surfaces 20, 21, and 20a, 21a. If a pressure probe is used then the registration of pressure at that point controls the quantity of liquid introduced through valve 119. A discharge conduit 120 joins casing 1d and is equipped with a manually operated hand valve 121 for controlling the rate of discharge of the refined material. The discharge tube 120 may assume a shape similar to discharge 56 shown in front view in FIG. 7 and in the top sectional view in FIG. 8.

To ensure that the liquid and the dry pulp issuing from the grinding surfaces are properly mixed and that the mixture is maintained in an annular movement in the casing 1, a plurality of small vanes or impellers 50b are attached to the periphery of the rotating disc 50.

Modification of FIG. 10

FIG. 10 shows another modification of the basic design of this invention in which the refiner is designed to refine the material on a single pass pressurized treatment while forcing the material between one set of grinding surfaces. The material flows in opening 70, then between the grinding surfaces 71, 72 and is discharged out a lower opening 78, as shown in FIG. 11. The base structure 2 is the same in this modification as in FIG. 1, however, the casing and cover 1c are substituted for the casing 1 of FIG. 1. In this arrangement, instead of the shaft being free to adjust itself to equal pressure on both sides of the revolving disc, this modification provides a hydraulic control shaft with one disc grinding surface 71 and one non-rotating grinding surface 72. Two bearing plugs 10, 11 are provided and the front plug 11 houses a radial bearing 76 and a double Kingsbury or spherical roller thrust bearing 73 which slides in a heavy sleeve 74 held rigid to the base structure by a series of webs 77. Attached to the end of sleeve 74 is a retainer plate 75 to which hydraulic cylinders 19 are attached. Cylinders 19 act against the thrust bearings 73, and force the shaft and surface 71 with the desired force or pressure against the surface 72.

Modification of FIG. 12

The modification shown in FIG. 12 of the basic refining apparatus of my invention features a front force feed screw 80 driven by separate power means (not shown) pushing the material fed through inlet 81 into the refiner for a single pass treatment. Spreader arm 82 connected to the shaft and rotating disc 83, distributes the material to and beween the grinding surfaces. In this modification, rotating disc 83 comprises two annular section: the inner portion of the rotating grinding surface 86 and the smaller outer portion 85. The stationary grinding surfaces are composed of the larger portion 86a and the outer, annular portion 85a. The distance between the disc and non-rotating surface 86a is controlled substantially by the same means shown and described in connection with FIG. 10, i.e., axial movement of shaft 6. However, in this modification, outer ring, non-rotating grinding surface 85a is further adjusted manually by a plurality of threaded shafts 84 positioned in threaded sleeves 87 with a handle 88, and chain and sprockets (not shown) attached to the shafts 84. This separate adjustable ring 85a is used to control the rate which pulp escapes from the area between the main grinding surfaces 86, 86a, or, in other words, to control the length of time the material is retained between the surfaces. The discharge from this refiner is through a gravity discharge opening 96. Pressure discharge may also be arranged as has been described and shown in connection with FIG. 16.

Certain changes are shown in the shaft control means in FIG. 12. A single Kingsbury or spherical roller front bearing 89, similar to that shown in FIG. 10, is used to support and control the axial movement of the shaft. However, this bearing is controlled by manual means consisting of handle 90, a shaft 91 and a sprocket 92 and chain 93, which in turn controls the movement of a plurality of threaded shafts 94 operating in threaded sleeves 95 to push the bearing plug 89 forward. Springs 97 are positioned against sleeve 98 so as to press the shaft in the opposite direction.

FIGS. 13–15 show a compound hinge arrangement which allows the front casing 1 to be withdrawn axially until clear of the internal parts of base structure 2 and then swung clear to the side of the unit where it can be inspected or otherwise worked. The hinge consists basically of two arms 110, 111 which join the casing at points 112, 112a and the base at points 113, 113a. Upon removal of the bolts (not shown) which hold the base when the refiner is in operation, the casing is swung clear of the base. By means of this structure, the various modifications described above can be placed within and altered while mounted in the front casing. In addition, the grinding surfaces may be inspected, cleaned or changed.

A further modification of the basic refiner of this invention is illustrated in FIG. 17. In this arrangement, the front detachable casing 200 joins the main frame 210 of the refiner by means of a pair of opposing annular flanges 202 and 212 which are held together by a plurality of bolts 205 located at various points around the periphery of the refiner. The flange 212, integrally formed with the main frame 210, and the flange 202, formed as part of casing 200, are shown also in FIGS. 1 and 4. A plurality of identical or equivalent radially arranged support ribs 214 extend from the front bearing sleeve 216 to a plurality of points 210a on the frame 210 and to the frame flange 212. Bearing sleeve 216 is located relatively close to the front of the frame 210 so as to provide as much support to the shaft adjacent the disc as possible. The radial ribs 214 hold and support the annular flange 212 thus preventing any portion of the casing 200 from becoming misaligned with the shaft 220 and the rotating disc 240. It is a serious disadvantage in the prior art refiners that the front casing, mounting stationary refining surfaces, is not adequately supported at a plurality of points around its periphery. It sometimes occurs that the casing under heavy refining loads becomes misaligned or moves out of strict parallel position with the rotating disc thereby causing the material to be refined to pass through a larger gap between grinding surfaces on the upper half of the refiner and through a narrower gap at the lower half. This causes the refined product to vary in quality and causes wear on the components.

The annular loading head 250, supporting refining surface 233, moves axially along the surface of guide piece 252 which is permanently mounted on flange 212 or the frame 210 in a manner shown in FIG. 4. As explained supra, loading head 250 carries a packing gland acting on a sleeve 254 mounted on the shaft 220 and is controlled in an axial direction by a plurality of hydraulic cylinders 256.

A perusal of all the loading arrangements used in this refining system shows that in every case the means of providing the refining load is applied to the main frame member 210 (FIG. 17) or 5 (FIGS. 1, 4,) either directly to the bearing sleeve 216 or at the pads which accommodate the loading cylinders 19. In all cases, the load is applied symmetrically about the shaft axis and is resisted also symmetrically about the shaft axis by the flange 212, which is attached to the points of load application by a plurality of either identical or equivalent radially symmetrically arranged support ribs 214 (FIG. 17), 25 (FIG. 1).

It should be apparent that this feature ensures that a deflection at any point on the flange 212 caused by the refining loads will be matched by an equal deflection at all other points on the flange, thus the flange surface will remain plane and at right angles or normal to the shaft axis and this ensures the maintenance of parallelism between the refining surfaces.

The strong refiner frame and the radial ribs supporting the annular flange 212 forming the front edge of the basic refiner provide a basic structure to which various front casings having a variety of grinding surfaces and feed apparatus can be selected and applied thereby providing a refiner system. As the basic refiner structure remains the same, only the casing components and possibly the disc need to be changed when a different refining treatment or feed arrangement is required.

The refiner shown in FIG. 17 is a modification of that shown in FIG. 1 which has the inlet arranged through a flexible hose connection to inlet 23. It has been established that this hose connection when inflated with the pulp inlet pressure causes a heavy load to be applied to the loading head of 17 and inhibits its ability to make fine adjustment to the treatment being given the material as it passes between the refining surfaces.

To eliminate this the inlet has been arranged axially with the feed through the opening occupied by the packing gland 222 and the flow is as indicated by the broken lines and arrows.

The feed is into the chamber 206, passing to the deflecting flange 207 and shaped surface 208. The material then flows through the gaps 231, 231a, formed between the stationary grinding sufaces 230, 233 and the moving surface 242 mounted on disc 240. After the material has passed between the refining surfaces, it is collected in the casing peripheral chamber 244 and is discharged through an opening as shown in the refiners of FIGS. 7 and 8. A pressurized discharge mechanism can be employed as shown and described in connection with FIG. 16.

This flow arrangement involves a pressure against the face of the shaft 220b and tends to displace disc 240 and shaft 220 towards the rear of the refiner. This causes the loading between the front refining surfaces 231 to be slightly less than the loading between the rear surfaces 231a. The difference in loading between the refining surfaces 231 and 231a is small in relation to the actual loads applied to the refining surfaces and for most practical applications is of no significance.

For those applications where it would have significance, then a shaft extension 220a and packing gland 222 are used. The flow arrangement is then as shown by the solid lines with inlet at the casing opening 204.

Another method of eliminating the difference in loading between the refining surfaces 231 and 231a is to provide a diaphragm head (not shown) or equivalent means of applying a load to the front bearing housing 201 in the forward direction and of the correct magnitude.

The magnitude is established by sensing the inlet pulp pressure and converting this pressure to a related pneumatic or hydraulic pressure which will provide the required load.

The modification of the refiner shown in FIG. 18 provides a structure having a front axial feed screw for a high consistency feed.

In refining materials which have a relatively cold temperature the material is delivered to the refining disc 300 by a feed screw 310 mounted on a shaft 312. The material is fed to a flinger 314 which is mounted by threaded bolts 316 to the front of the shaft 318. The flinger catches the material moving in the direction of the arrows from the feed screw 310 and throws the material outwardly between the surface of the revolving disc 300 and the annular ring 320 which blocks the space between the casing 330 and the feed screw tube 311 so that it will pass between the pairs of grinding surfaces 302 and 304.

When refining hot material or materials which are heated to a relatively hot temperature by the mechanical energy expended in refining, steam is produced between the grinding surfaces and in the area surrounding the flinger. The produced steam on all prior art refiners must return into the feed screw 310 and in doing so carries away the chips or materials which are ready to enter the refining zone. This results in temporary periods of no pulp going through the refiner followed by an immediate period where an excess goes through consisting of the normal feed plus that blown back by that steam.

To overcome this objection, this modification of the refiner of this invention incorporates a removable ring 320 held in position by a plurality of axially directed bars 324 which also serve to locate the feed screw 310 in the center of the refiner casing inlet 350 and support the feed screw tube 311. The removable ring 320 occupies only a portion of the annular area between the casing opening 330 and the feed screw tube 311 thereby providing an annular opening 322 around the inward edge of the tube 311.

By the provision of the ring 320 and annular opening 322, steam puffs produced in the refining process escape through opening 322 as indicated by the broken arrows without disturbing the chips fed to the disc 300. In normal operation, air flows in through the annular space 322 as indicated by the solid arrows so as to keep the opening clear. In those refiners producing large volumes of steam, the ring 320 may be removed so as to provide a larger space encompassing the distance between tube 311 and casing 330. It should be understood that the provision of this modification provides for a steady and continuous flow of material through the refining gaps between the refining surfaces 302 and 304 resulting in a product of greater uniformity.

Although this invention has been described with reference to specific forms and embodiments thereof, it will be apparent to those skilled in the art that various changes other than those referred to above may be made in the form of the apparatus, that equivalent elements may be substituted for those illustrated in the drawings, that parts may be reversed, that certain parts shown separate may be simplified to fewer or one part to provide individual type refiners which may sacrifice the interchangeable feature of the system, and that certain features of the invention may be used to advantage independently of the use of other features, or within the spirit and scope of the invention as defined in the appended claims.

What is claimed is:

1. A refining apparatus comprising:
   (A) a main frame including a stress receiving member,
   (B) a rotatable drive shaft mounted in said main frame for rotational movement about its main axis,
   (C) said stress receiving member of said main frame having a forwardly facing first flange, said stress receiving member being designed such that said flange will exhibit radial deflection symmetry relative to said main axis when subjected to radially symmetrical forces parallel to said main axis,
   (D) a casing having a rearwardly facing second flange, said second flange being attached to said first flange at a sufficient number of spaced points to ensure that said casing cannot deflect independently of said stress receiving member, said casing being designed so as to exhibit radial deflection symmetry relative to said main axis of said drive shaft when subjected to radially symmetrical forces parallel to said main axis,
   (E) a non-rotatable first refining plate attached to and supported by said casing, said plate having a first refining surface perpendicular to said main axis of said drive shaft, said plate being supported by said casing so that said plate cannot deflect independently of said casing,
   (F) a rotatable plate support disc supported on the front end of said drive shaft for rotation with said drive shaft, said rotatable support disc being designed to exhibit radial deflection symmetry relative to said main axis of said drive shaft when subjected to radially symmetrical forces parallel to said main axis,
   (G) a second refining plate having a second refining surface disposed parallel to and facing said first refining surface, said second refining plate being attached to and supported by said rotatable support disc so that said second refining plate cannot deflect independently of said rotatable support disc, and
   (H) loading means to apply in a radially symmetrical fashion a force to said rotatable plate, said force being parallel to said main axis and in a direction tending to cause said refining surfaces to bear against one another,
   whereby said refining surfaces will remain parallel to one another and perpendicular to said main axis of said drive shaft whenever axial deflections are sustained by said member, casing, disc, and/or plates.

2. The refining apparatus of claim 1 wherein said loading means includes:
   a plurality of hydraulic cylinders radially symmetrically spaced around said main axis and connected between said main frame and said drive shaft to exert a predetermined loading force that is radially symmetrical about said main axis, parallel to said main axis and in a direction tending to cause said refining surfaces to bear against one another.

3. The refining apparatus of claim 1 further characterized by:
   said casing and said non-rotatable first refining plate having an inlet opening along said main axis of said drive shaft, and
   feeding means for feeding material through said inlet opening to said second refining plate so that whatever material is fed by said feeding means will be refined between said first and said second refining surfaces,
   said casing including an annular space around said feeding means and within said inlet opening whereby air may be admitted to said grinding surfaces and steam puffs from said grinding surfaces may be emitted through said annular opening.

4. A refining apparatus comprising:
   (A) a main frame including a stress receiving member,
   (B) a rotatable drive shaft having a main axis, said shaft being mounted in said main frame free to move axially relative to said main frame,
   (C) said stress receiving member of said main frame having a forwardly facing first flange, said stress receiving member being designed such that said flange will exhibit radial deflection symmetry relative to said main axis of said drive shaft when usbjected to radially symmetrical forces parallel to said main axis,
   (D) a casing having a rearwardly facing second flange, said second flange being attached to said first flange at a sufficient number of spaced points to ensure that said casing cannot deflect independently of said stress receiving member, said casing being designed so as to exhibit radial deflection symmetry relative to said main axis of said drive shaft when subjected to radially symmetrical forces parallel to said main axis, (E) a non-rotatable first refining plate attached to and supported by said casing, said plate having a first refining surface perpendicular to said main axis of said drive shaft, said plate being supported by said casing so that said plate cannot deflect independently of said casing, (F) a rotatable plate support disc supported on the forward portion of said drive shaft for rotation with said drive shaft, said rotatable support disc being designed to exhibit radial deflection symmetry relative to said main axis of said drive shaft when subjected to radially symmetrical forces parallel to said main axis, said rotatable support disc having a first surface facing said first refining surface and a second surface substantially parallel to said first surface and facing away from said first refining surface, (G) a second refining plate having a second refining surface disposed parallel to and facing said first refining surface, said second refining plate being attached to and supported by said first support surface of said rotatable support disc so that said second refining plate cannot deflect independently of said rotatable support disc, (H) a third refining plate having a third refining surface, said third refining plate being attached to and supported by said second support surface of said rotatable support disc so that said third refining plate cannot deflect independently of said rotatable support disc, (I) a loading head having a forwardly facing surface, said loading head being mounted for axial movement relative to said drive shaft and to said main frame, (J) a non-rotatable fourth refining plate having a fourth refining surface disposed parallel to and facing said third refining surface, said fourth refining plate being attached to and supported by said loading head so that said fourth refining plate cannot deflect independently of said loading head, and (K) loading means to apply in a radially symmetrical fashion a force to said loading head, said force being parallel to said axis in a direction tending to cause said facing refining surfaces to bear against one another, whereby said refining surfaces will remain parallel to one another and perpendicular to said main axis of said drive shaft whenever axial deflections are sustained by said member, casing, disc, head and/or plates.

5. The refining apparatus of claim 4 wherein said loading means includes:
a plurality of hydraulic cylinders radially symmetrically spaced around said main axis and connected between said main frame and said loading head to exert a predetermined loading force on said head that is radially symmetrical about said main axis, parallel to said main axis and in a direction tending to cause said refining surfaces to bear against one another.

6. The refinining apparatus of claim 4 further characterized by:
support means mounted on said main frame to support said loading head at its periphery and to permit reciprocal movement of said loading head in a direction parallel to said main axis of said drive shaft, and
a flexible annular diaphragm having an outer circumference and an inner circumference, said inner circumference of said diaphragm being connected to said loading head and said outer circumference of said diaphragm being connected to said support means to prevent seepage of material between said loading head and said support means while permitting axial movement of said loading head.

7. The refining apparatus of claim 6 wherein said support means comprises:
an annular guide piece connected to said main frame and having an inwardly facing annular first bearing surface,
a second annular guide piece connected to said loading head, said second guide piece having an outwardly facing annular second bearing surface, said second bearing surface bearing on said first bearing surface, and
means connecting said first and said second guide pieces to prevent rotation of said guide pieces relative to one another and to permit limited axial movement of said guide pieces relative to one another along said bearing surfaces,
said outer circumference of said diaphragm being connected to the forward end of said first guide piece and the inner circumference of said diaphragm being connected to the forward end of said second guide piece so that said diaphragm prevents whatever material is being refined from entering between said bearing surfaces while permitting axial movement of said surfaces relative to one another.

8. The refining apparatus of claim 4 further characterized by:
an inlet opening in said casing through which material to be refined may be fed to said refining surfaces, and
a front extension of said drive shaft extending through said inlet opening to minimize pressure against the front edge of said drive shaft.

9. The refiner of claim 4 further characterized by:
means for supplying liquid to the casing assembly around its periphery, the rate of flow of said liquid being controlled automatically according to the temperature or pressure of the refined material passing from the grinding surfaces.

10. In a pulp refiner having a main frame and a casing assembly, said frame having a shaft mounted therein upon a plurality of bearings, a movable loading head mounted for axial movement along the shaft, said head having a refining surface attached therein, said head having support means mounted on the main frame and adapted to support the loading head at its periphery, the improvement comprising:
a flexible annular diaphragm connected to the loading head around its circumference and connected to the support means so that seepage of material between the loading head and support means is prevented while movement of said head remains unrestricted.

11. In a pulp refiner having a main frame and a front casing asembly, said frame having a shaft mounted therein upon a plurality of bearings, a disc having a pair of grinding surfaces mounted on the shaft, a grinding surface mounted on the front casing assembly and a grinding surface mounted on a movable loading head, said head having power means for controlling its position relative to the front casing assembly, the improvement comprising:
means for introducing pulp to the refiner on one side of the disc and for directing the flow of pulp between the rotating disc and the two grinding surfaces, said means including an annular flange and a curved surface formed in the hub openings in said disc, said openings providing a flow of pulp to one side of said disc, said curved surface and flange positioned to cause the flow of pulp to divide substantially equally between both sides of said disc.

12. The refiner as defined in claim 11 wherein the flow directing flange is mounted on the disc and rotates therewith, said flange having an extension positioned proximate to the pulp inlet.

13. In a pulp refiner having a front casing and a main frame, said frame having a shaft mounted therein on a plurality of bearings, a rotating grinding disc mounted on the shaft adjacent the front casing and drive means attached to the shaft at its rear end, the improvement of an axial feed structure comprising:

an inlet opening in the front casing along the axis of the shaft, feed tube means for feeding material to the rotating grinding disc through said inlet opening, and an annular space located around said feed tube means and within said inlet opening, said space providing for the entrance of air to the rotating disc and the outward flow of steam puffs from the rotating disc.

14. The refiner of claim 13 further characterized by: a removable annular ring located within said inlet opening and adjacent said feed tube, said ring being of such size as to partially restrict the size of the space around the feed tube and whereby a smaller ring may be substituted when larger volumes of steam are produced in the refining process.

References Cited

UNITED STATES PATENTS

| | | | |
|---|---|---|---|
| 1,499,233 | 6/1924 | Lenart et al. | 241—256 X |
| 2,931,586 | 4/1960 | Messing | 241—256 |
| 3,131,877 | 5/1964 | Budzien | 241—255 |

FOREIGN PATENTS

| | | |
|---|---|---|
| 836,911 | 6/1960 | Great Britain. |
| 857,990 | 4/1940 | France. |

HARRISON L. HINSON, *Primary Examiner.*